US007584029B2

(12) United States Patent
Legate et al.

(10) Patent No.: US 7,584,029 B2
(45) Date of Patent: Sep. 1, 2009

(54) TELEMATICS-BASED VEHICLE DATA ACQUISITION ARCHITECTURE

(75) Inventors: Ian Legate, Stockport (GB); David Stott, Stockport (GB)

(73) Assignee: Teradyne, Inc., North Reading, MA (US)

( * ) Notice: Subject to any disclaimer, the term of this patent is extended or adjusted under 35 U.S.C. 154(b) by 75 days.

(21) Appl. No.: 10/749,264

(22) Filed: Dec. 31, 2003

(65) Prior Publication Data

US 2005/0182534 A1 Aug. 18, 2005

(51) Int. Cl.
*G06F 9/44* (2006.01)

(52) U.S. Cl. ............................ 701/29; 701/36; 703/22; 717/121; 717/147

(58) Field of Classification Search .................. 701/29, 701/36; 703/22, 23; 717/121, 147, 140, 717/177, 120; *G06F 9/44*
See application file for complete search history.

(56) References Cited

U.S. PATENT DOCUMENTS 5,214,582 A 5/1993 Gray et al.
5,916,286 A * 6/1999 Seashore et al. .............. 701/29
5,916,287 A * 6/1999 Arjomand et al. ............. 701/29
5,935,180 A * 8/1999 Fieramosca et al. ........... 701/29
6,175,787 B1 1/2001 Breed
6,181,992 B1 1/2001 Gurne et al.
6,181,994 B1 1/2001 Colson et al.
6,189,057 B1 * 2/2001 Schwanz et al. .............. 710/72
6,236,909 B1 * 5/2001 Colson et al. .................. 701/1
6,301,531 B1 10/2001 Pierro et al.
6,330,499 B1 12/2001 Chou et al.
6,434,455 B1 8/2002 Snow et al.
6,577,934 B2 * 6/2003 Matsunaga et al. ............ 701/29
6,611,739 B1 * 8/2003 Harvey et al. ................. 701/29
6,748,305 B1 * 6/2004 Klausner et al. .............. 701/35
7,269,482 B1 * 9/2007 Shultz et al. .................. 701/1
2002/0128985 A1 9/2002 Greenwald
2003/0093199 A1 * 5/2003 Mavreas ...................... 701/33
2003/0167345 A1 9/2003 Knight et al.
2003/0182577 A1 * 9/2003 Mocek ....................... 713/201
2004/0068350 A1 * 4/2004 Tomson ......................... 701/1
2004/0138790 A1 * 7/2004 Kapolka et al. ............... 701/29
2004/0215439 A1 * 10/2004 Movall et al. ................. 703/22
2005/0021294 A1 * 1/2005 Trsar et al. .................. 702/183
2005/0060070 A1 * 3/2005 Kapolka et al. ............... 701/29
2005/0107132 A1 * 5/2005 Kamdar et al. ........... 455/569.2
2005/0154500 A1 * 7/2005 Sonnenrein et al. ............ 701/1
2006/0050735 A1 * 3/2006 Isaac et al. .................. 370/469
2006/0095174 A1 * 5/2006 Sonnenrein et al. ........... 701/33

FOREIGN PATENT DOCUMENTS

EP 1349117 A 10/2003
WO WO 02/17184 A 2/2002

* cited by examiner

*Primary Examiner*—Tuan C To

(57) ABSTRACT

A method of acquiring vehicle data from a vehicle data bus is disclosed. The method is responsive to the execution of a telematics application on a local telematics unit. The method comprises first accessing a local vehicle library, in response to vehicle data requests from the application. The local vehicle library then carries out steps comprising: retrieving vehicle data bus information from a database; using the vehicle data bus information to extract vehicle data from the vehicle data bus, the vehicle data corresponding to the requests for vehicle parameter data; interpreting the retrieved vehicle data; and providing the interpreted data to the telematics application to satisfy the request for vehicle data.

12 Claims, 2 Drawing Sheets

TELEMATICS-BASED VEHICLE DATA ACQUISITION ARCHITECTURE

FIELD OF THE INVENTION

The invention relates generally to vehicle data acquisition equipment, and more particularly a vehicle data acquisition architecture for telematics-based vehicle applications.

BACKGROUND

Modern vehicles increasingly employ advanced electronic systems for improved communications, safety, vehicle operation and control. Due to their complexity, appropriate methods for testing and diagnosing the systems after deployment in the vehicle is important. However, in order to diagnose one or more of the systems, appropriate vehicle data often needs to be extracted from the systems. Service bays typically carry out the diagnostics during standard warranty services and/or following a suspected system failure.

Typically, a vehicle data bus infrastructure handles the signal communication to and from the system(s). Vehicle data bus architectures, and the data conveyed on the buses, are typically vehicle-dependent, or specific to the vehicle make and/or manufacturer. With exception to the legislative requirements (e.g. OBDII), conventional methods of interfacing with the vehicle data bus to effect diagnostics servicing often requires OEM-specific software and hardware.

These differences in bus standards and bus data content give rise to an ever-increasing number of vehicle variants. This increasing number of variants presents a problem to the people who create telematics applications that use vehicle data to provide meaningful content. An example of such an application is Navigation that employs road-speed data to perform dead reckoning.

Conventionally, application programmers often need an intimate understanding of each vehicle's data-bus architecture and associated knowledge in how to extract desired vehicle data from that architecture. This approach typically requires a substantial investment in time and cost for the programmer. In addition, the application generally requires customization from one vehicle make and/or model, to the next. This presents a problem in terms of application portability to all potential telematics platforms.

While the burdens and costs on the application programmer due to the conventional architecture described above present significant problems, the vehicle manufacturer also encounters undesirable issues. For example, in order to support the applications programmers conventionally, the vehicle manufacturer often must release sensitive intellectual property concerning the vehicle data-bus architecture. Moreover, the reliability of the vehicle electronics may be compromised through data access not controlled to the highest possible standards.

What is needed and as yet unavailable is a telematics-based vehicle data acquisition architecture that enables telematics application programmers to develop applications that can extract vehicle data with generic data requests independent of the vehicle data bus architecture. The telematics-based vehicle data acquisition system described herein satisfies this need.

SUMMARY

The telematics-based vehicle diagnostics system described herein provides a unique way to allow telematics application programmers to program their applications without the burden of knowing the precise data bus architecture for each vehicle make and model. This provides for better application portability, debug capabilities, and reduced overall development costs.

To realize the foregoing advantages, the diagnostics system in one form comprises a method of acquiring vehicle data from a vehicle data bus. The method is responsive to the execution of a telematics application on a local telematics unit. The method comprises first accessing a local vehicle library, in response to vehicle data requests from the application. The local vehicle library then carries out steps comprising: retrieving vehicle data bus information from a database; using the vehicle data bus information to extract vehicle data from the vehicle data bus, the vehicle data corresponding to the requests for vehicle parameter data; interpreting the retrieved vehicle data; and providing the interpreted data to the telematics application to satisfy the request for vehicle data.

In another form, a vehicle data acquisition system is described for extracting vehicle data from a vehicle data bus for telematics applications. The vehicle data acquisition system comprises a remote telematics unit having a server, and a vehicle database running on the server. The vehicle database includes vehicle-specific data bus architecture information. The system further includes a local telematics unit comprising a controller, an application program running on the controller and comprising at least one vehicle data request, and at least one library. The library is interposed between the application program and the vehicle data bus. Each library comprises a data retriever, a data interpreter, and a wireless link responsive to the data retriever for establishing a network connection to the remote server, the link providing a data download path for transferring the data bus architecture information to the local telematics unit.

Other features and advantages will be apparent from the following detailed description when read in conjunction with the accompanying drawings.

BRIEF DESCRIPTION OF THE DRAWINGS

The vehicle diagnostics system and method will be better understood by reference to the following more detailed description and accompanying drawings in which.

DETAILED DESCRIPTION

The telematics-based vehicle data acquisition architecture described herein, generally designated 10 (FIG. 1), provides a unique way of simplifying the vehicle interface for telematics applications programmers. This is accomplished by interposing vehicle libraries 28 between the telematics application and the proprietary vehicle data bus (not shown). The vehicle libraries respond to generic requests from the application to access data from any vehicle data bus. As a result, the application programmer need not know the precise details of the vehicle data bus in order to develop the application.

Figure 1:
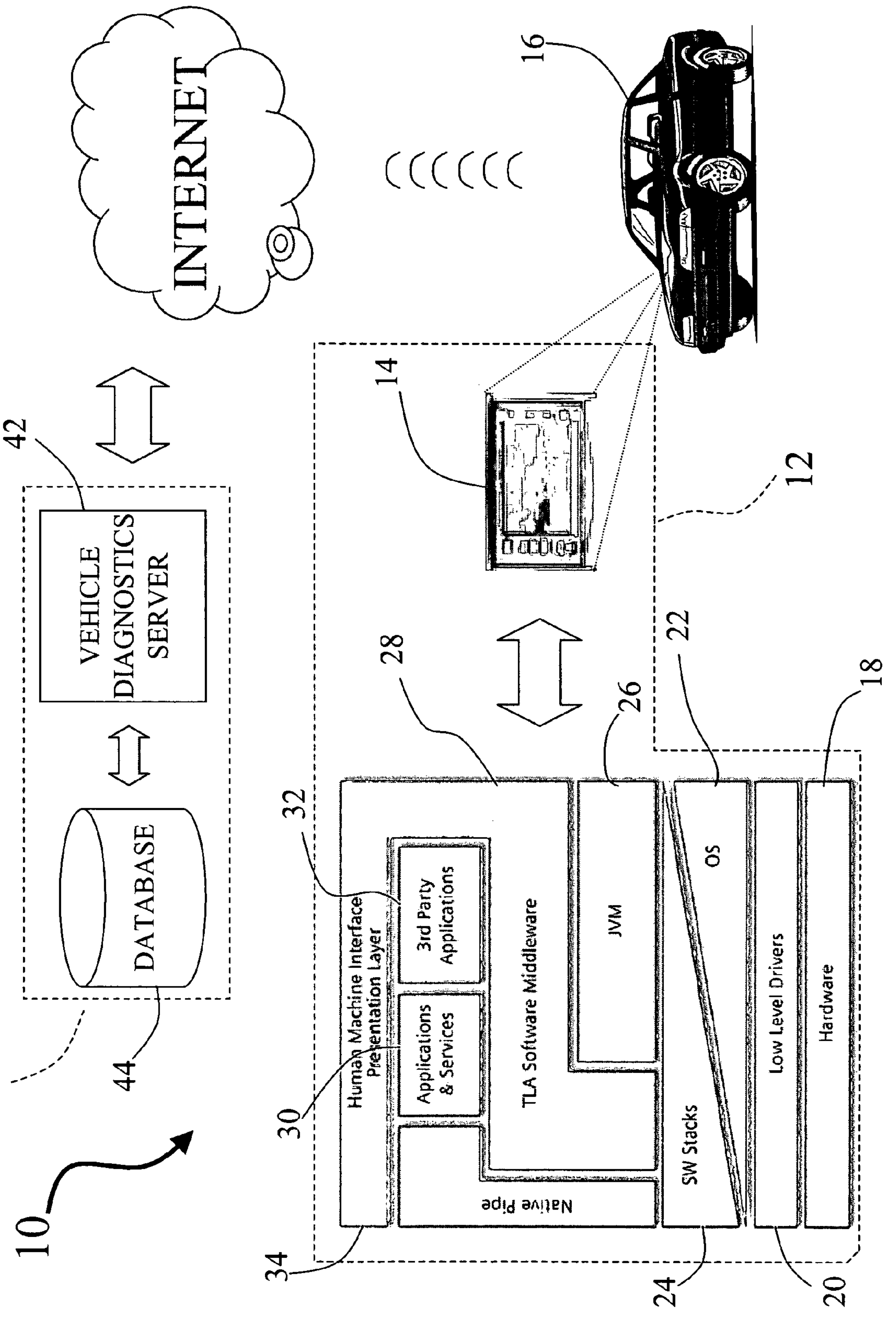
FIG. 1 is a block diagram of a telematics-based vehicle diagnostics architecture.

Referring now to FIG. 1, the vehicle diagnostics architecture 10 includes a local data acquisition unit 12 having a telematics control unit (TCU) 14 installed in a vehicle 16. TCU's are well known, with one particular example known under the trademark "ONSTAR". Typically, the unit comprises a computer having hardware 18 that connects to the vehicle internal data network (not shown), often referred to as a control area network, or CAN. One standard for a suitable network is known under the J1850 specification, although other standards may be employed as well. Applications such as navigation, security, and vehicle diagnostics are possible through the TCU's interface to the vehicle data bus infrastructure.

Further referring to FIG. 1, the local data acquisition unit 12 includes a collection of software modules to control and direct the hardware 18 to provide benefits for telematics applications programmers. Included in this collection are low-level drivers 20 in the form of software modules, a real time operating system 22 and software stacks 24. The operating system and software stacks provide a main control function over the TCU 14 and maintain tight cohesion between the TCU software and hardware 18.

Sitting on the real time operating system 22 is a Java virtual machine (JVM) 26 that provides an interpretation engine for Java-based telematics application programs. The JVM interfaces with a set of runtime libraries 28 in the form of an application programmers interface (API) that provides the software functionality to generate an abstract interface between the hardware and software applications. The libraries are constructed using Java technology and include the functionality to interface with the high-level applications program, retrieve data bus information, establish a wireless link, extract data from the vehicle data bus, and interpret the data as more fully described below.

User-generated Java-based algorithms, diagnostic sequences and the like sit on the libraries in the form of third-party applications 30 and services 32. These modules control how the libraries are used as information building blocks. As an optional feature, a human machine interface 34 such as a graphical user interface (GUI) is provided.

The telematics unit 14 preferably employs an open-standard services delivery platform, such as that specified by the Open Services Gateway Initiative (OSGi). The platform provides a flexible delivery mechanism over wide area networks to local networks and devices.

To take advantage of the telematics services delivery platform, the vehicle data acquisition architecture further includes a vehicle data center 40 based remotely from the local vehicle data acquisition unit 12. The center comprises a vehicle data server 42 operating in cooperation with a vehicle database 44. The database provides a repository for vehicle-specific data bus information. The information is gathered from vehicle manufacturers and includes proprietary data bus configurations for each vehicle make and model potentially served by the telematics application.

In practice, a telematics applications programmer can take advantage of the vehicle libraries 28 to simplify the application at a high level such that data requests may be made generically, or independent of the vehicle make or model. As an example, and referring to FIG. 2, if vehicle speed data is required during the execution of a telematics application, at step 200, the following lines would suffice to secure the data for the application:

```
IF
  GetVehicleData(EngineSpeed)>5 mph
THEN
  CheckValue(DoorsLocked)
```

Figure 2:
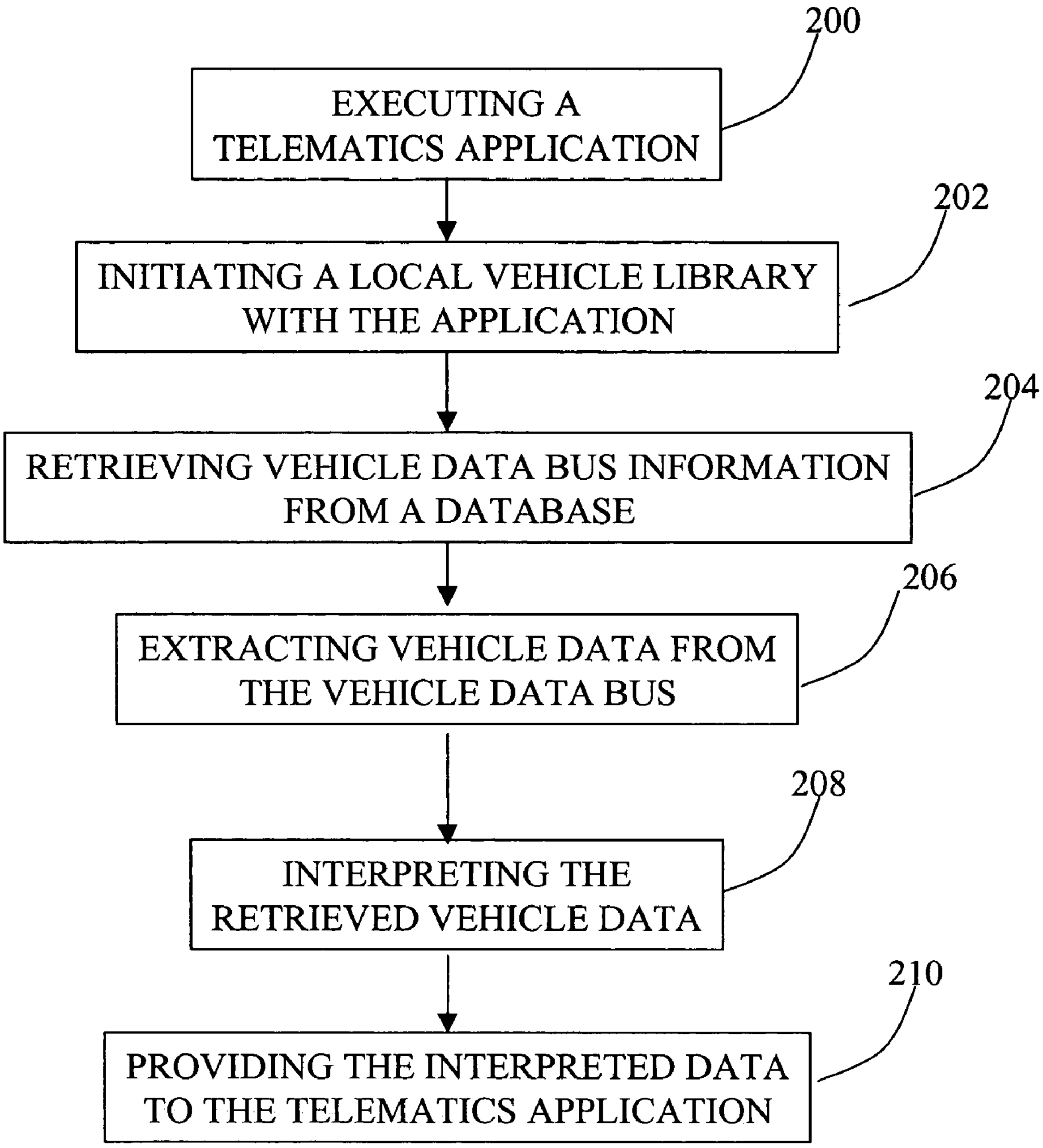
FIG. 2 is a flowchart illustrating a method of acquiring data with the architecture of FIG. 1.

Further referring to FIG. 2, with the application running, the program string regarding engine speed initiates action, at step 202, on the part of the runtime library to furnish the vehicle speed data to the application. The vehicle runtime library 28 then responds to the application request, at step 204, by retrieving the proprietary vehicle data bus information from the remote runtime database 44. The information includes, for example, the data protocol type, the access method for the parameter, value addresses, shift and mask information, return value decoding methods, scaling and unit conversion, etc.

The retrieval, at step 204, is accomplished by establishing a wireless link through the open-standard services delivery platform, to the remote server 42. The server then queries the database 44 for the appropriate vehicle data bus information, and downloads it to the TCU runtime library 28 via the wireless link.

Once the proprietary vehicle data bus information is retrieved, the specific data (in this example, vehicle speed) is extracted from the databus, at step 206, in the form of raw bytes. The extraction includes passing the data bus information to a protocol driver (not shown), and retrieving the specific raw data from the protocol driver. The library 28 then utilizes the value decoding, scaling and unit conversion information to interpret the data, at step 208, and provide it in a meaningful format for use by the application, at step 210. The application then utilizes the information to provide its intended content. The information retrieval potentially occurs many times throughout the application execution, providing vehicle data bus access to the application via the runtime library.

Those skilled in the art will recognize the many benefits and advantages afforded by the present invention. Of significant importance is the use of an intermediate abstract software layer to extract vehicle data requested by a telematics application. By employing the library, the burden of knowing the specific vehicle bus architecture is removed from the application programmer and undertaken by the library and the remote server. As a result, telematics applications that utilize vehicle data can be developed at higher levels, significantly improving the portability of the application between platforms.

While the invention has been particularly shown and described with reference to the preferred embodiments thereof, it will be understood by those skilled in the art that various changes in form and detail may be made therein without departing from the spirit and scope of the invention. For instance, although the vehicle data acquisition architecture described herein identifies a specific diagnostics telematics use, it should be understood that any telematics application using vehicle data (such as navigation, security, etc.) may benefit from the architecture described herein.

What is claimed is:

1. A method of acquiring vehicle parameter data from a vehicle data bus, comprising:

providing a telematics application on a local telematics unit within a vehicle, the telematics application implemented as a software program including generic requests for vehicle parameter data that are not specific to any particular make or model of the vehicle;

providing an abstract software layer operatively disposed between the telematics application and the vehicle data bus;

executing the telematics application;

retrieving, by the abstract software layer and responsive to a request for vehicle parameter data from the telematics application, vehicle data bus configuration information from a database that stores data bus configuration information for a plurality of different types of data busses, the retrieved vehicle data bus configuration information being associated with the type of data bus used on the vehicle on which the telematics application is executed;

extracting vehicle parameter data from the vehicle data bus using the vehicle data bus configuration information retrieved from the database, the vehicle parameter data corresponding to the request for vehicle parameter data;

interpreting the retrieved vehicle parameter data; and providing the interpreted vehicle parameter data to the telematics application to satisfy the request for vehicle parameter data.

2. A method according to claim 1 wherein the step of retrieving comprises:

establishing a wireless link to a remote server;

accessing a vehicle database with the remote server; and downloading vehicle data bus information to the local vehicle library from the remote database.

3. A method according to claim 2 wherein the step of using further comprises passing the vehicle data bus configuration information to a protocol driver.

4. A method according to claim 1 wherein:

the telematics application comprises a vehicle diagnostics application program.

5. A method of acquiring vehicle parameter data from any of a plurality of different vehicle makes, comprising:

executing a telematics application on a local telematics unit operatively connected to a vehicle;

requesting vehicle parameter data by the telematics application;

accessing, responsive to the step of requesting vehicle parameter data, a database that stores data bus configuration information for a plurality of different vehicle makes;

querying the database to retrieve data bus configuration information for a particular vehicle make that corresponds to the vehicle;

extracting vehicle parameter data from a vehicle data bus using the vehicle data bus configuration information; and conditionally requesting other vehicle parameter data by the telematics application depending upon the extracted vehicle parameter data.

6. A method as recited in claim 5, wherein the step of extracting comprises passing the data bus configuration information to a protocol driver.

7. A method as recited in claim 5, wherein the telematics application includes a plurality of requests for vehicle parameter data, the method comprising, for each request, accessing, responsive to the step of requesting vehicle parameter data, the database that stores data bus configuration information for a plurality of different vehicle makes;

querying the database to retrieve data bus configuration information for a particular vehicle make; and extracting vehicle parameter data from a vehicle data bus using the vehicle data bus configuration information.

8. A method as recited in claim 5, wherein the step of accessing comprises establishing a wireless link to a remote server operatively connected to the vehicle database.

9. A method as recited in claim 5, wherein the local telematics unit employs an open standard services delivery platform.

10. A method as recited in claim 1, wherein the request for vehicle parameter data is a first request, and further comprising the telematics application making a second request for vehicle parameter data responsive to the interpreted data returned in response to the first request.

11. A method as recited in claim 5, wherein the telematics application is one of a navigation application, a security application, and a diagnostic application.

12. A method of deploying a telematics application in a plurality of vehicles having different makes and/or models, wherein an abstract software layer is installed within each of the plurality of vehicles and is operatively connected to a data bus of the respective vehicle, comprising, for each vehicle:

providing a telematics application that includes a generic request to the abstract software layer for vehicle parameter data;

running the telematics application within the respective vehicle;

retrieving, by the abstract software layer and responsive to the generic request for vehicle parameter data by the telematics application, vehicle data bus configuration information from a database that stores data bus configuration information for a plurality of different types of data buses, the retrieved vehicle data bus configuration information being associated with the type of data bus used on the vehicle on which the telematics application is run;

extracting vehicle parameter data from the vehicle data bus using the vehicle data bus configuration information retrieved from the database; and providing the extracted vehicle parameter data to the telematics application to satisfy the generic request.

* * * * *